United States Patent
Zhang et al.

(10) Patent No.: US 9,078,133 B2
(45) Date of Patent: Jul. 7, 2015

(54) METHOD, SYSTEM AND MOBILE TERMINAL FOR CONFIGURING AND APPLYING LOCKING STRATEGY OF MOBILE TERMINAL

(75) Inventors: Li Zhang, Shenzhen (CN); Chunyuan Han, Shenzhen (CN); Qiang Zhang, Shenzhen (CN); Baoling Ji, Shenzhen (CN)

(73) Assignee: ZTE CORPORATION (CN)

( * ) Notice: Subject to any disclaimer, the term of this patent is extended or adjusted under 35 U.S.C. 154(b) by 172 days.

(21) Appl. No.: 13/880,796

(22) PCT Filed: Feb. 10, 2011

(86) PCT No.: PCT/CN2011/070912
§ 371 (c)(1),
(2), (4) Date: Apr. 22, 2013

(87) PCT Pub. No.: WO2012/051816
PCT Pub. Date: Apr. 26, 2012

(65) Prior Publication Data
US 2013/0231089 A1    Sep. 5, 2013

(30) Foreign Application Priority Data
Oct. 22, 2010 (CN) .......................... 2010 1 0517558

(51) Int. Cl.
*H04W 12/08* (2009.01)
*H04L 29/08* (2006.01)
(Continued)

(52) U.S. Cl.
CPC .............. *H04W 12/08* (2013.01); *H04W 24/02* (2013.01); *H04W 88/02* (2013.01); *H04L 67/34* (2013.01); *H04W 8/183* (2013.01); *H04W 12/12* (2013.01); *H04M 1/67* (2013.01); *H04M 1/72583* (2013.01)

(58) Field of Classification Search
CPC .... H04L 67/34; H04M 1/67; H04M 1/72583; H04W 12/08; H04W 12/12; H04W 24/02; H04W 88/02; H04W 8/183

USPC ............ 455/410–411, 414.1–414.4, 418–420
See application file for complete search history.

(56) References Cited

U.S. PATENT DOCUMENTS

2007/0050622 A1* 3/2007 Rager et al. .................... 713/168
2009/0203356 A1* 8/2009 Li et al. .......................... 455/411
(Continued)

FOREIGN PATENT DOCUMENTS

CN            1655643 A        8/2005
CN            1845622 A        10/2006
(Continued)

OTHER PUBLICATIONS

International Search Report for corresponding application PCT/CN2011/070912 filed Feb. 10, 2011; Mail date Jul. 28, 2011.

*Primary Examiner* — Kashif Siddiqui
(74) *Attorney, Agent, or Firm* — Cantor Colburn LLP

(57) ABSTRACT

The disclosure provides a method for configuring a locking strategy of a mobile terminal, comprising: setting, at a locking strategy setting terminal, relevant information of a locking strategy which needs to be executed by a mobile terminal and transmitting the relevant information to the mobile terminal, when the mobile terminal determines that the mobile terminal is currently unlocked, storing the relevant information of the locking strategy which needs to be executed by the mobile terminal; or, inputting, at the mobile terminal, relevant information of a locking strategy which needs to be executed, and storing the inputted relevant information of the locking strategy which needs to be executed. The disclosure further provides a method for applying a locking strategy of a mobile terminal as well as a system and a terminal mobile for configuring a locking strategy of a mobile terminal. According to the technical solutions of the disclosure, the locking strategy of the mobile terminal can be conveniently and flexibly configured.

11 Claims, 3 Drawing Sheets

(51) Int. Cl.
  *H04W 8/18*  (2009.01)
  *H04M 1/67*  (2006.01)
  H04W 24/02  (2009.01)
  H04W 88/02  (2009.01)
  H04W 12/12  (2009.01)
  H04M 1/725  (2006.01)

(56) References Cited

U.S. PATENT DOCUMENTS

2010/0255813 A1* 10/2010 Belrose et al. ............... 455/411

2012/0094636 A1* 4/2012 Li et al. ........................ 455/411

FOREIGN PATENT DOCUMENTS

| CN | 10126834 A | | 8/2007 |
| CN | 101163309 A | | 4/2008 |
| KR | 20010065039 A | | 7/2001 |
| KR | 2006100086 A | * | 9/2006 |

* cited by examiner

METHOD, SYSTEM AND MOBILE TERMINAL FOR CONFIGURING AND APPLYING LOCKING STRATEGY OF MOBILE TERMINAL

TECHNICAL FIELD

The disclosure relates to a mobile terminal locking technology, and more particularly, to a method, a system and a mobile terminal for configuring and applying a locking strategy of a mobile terminal.

BACKGROUND

Currently, more and more mobile terminals are being applied broadly and mobile terminal products can be customized by mobile communication operators according to their requirements. A mobile communication operator may require locking a network, a card or a mobile terminal etc. when customizing a mobile terminal product. Locking the mobile terminal is a special requirement for the mobile terminal and the customized mobile terminal can only use a specific mobile network, or a specific Subscriber Identity Module (SIM) card/Universal Subscriber Identity Module (USIM) card. Locking the card is a special requirement for the card, after the card is locked, it is required that the card can be only used on a certain mobile terminal and cannot be used on other mobile terminals. Locking a network, a card and a mobile terminal can effectively solve problems of secret change of a network by a user, unauthorized distribution of goods and loss of customers etc.

In related technologies, in order to lock a network or a card for the mobile terminal and lock the mobile terminal, a locking strategy is usually written in a mobile terminal when the mobile terminal is researched and developed. Therefore, the locking strategy is fixed and cannot be modified even by a mobile communication operator. With the development of mobile terminal technologies and continuous growth of services of mobile communication operators, the number of users is growing, along with increasing demands of the mobile communication operators. How to increase research and development efficiency, production efficiency and the configuration flexibility for customers to the greatest extent is a problem to be solved.

SUMMARY

In view of the above, the disclosure provides a method, a system and a mobile terminal for configuring and applying a locking strategy of a mobile terminal, so that the locking strategy of the mobile terminal can be conveniently and flexibly configured.

The disclosure provides the following technical solution.

The disclosure provides a method for configuring a locking strategy of a mobile terminal, comprising:

setting, at a locking strategy setting terminal, relevant information of a locking strategy which needs to be executed by a mobile terminal and transmitting the relevant information to the mobile terminal; and when the mobile terminal determines that the mobile terminal is currently unlocked, storing the relevant information of the locking strategy which needs to be executed by the mobile terminal.

In the method above, the method further comprises: when the mobile terminal determines that the mobile terminal is currently locked, prompting to operate over again via the locking strategy setting terminal.

In the method above, setting, at the locking strategy setting terminal, the relevant information of the locking strategy which needs to be executed by the mobile terminal and transmitting the relevant information to the mobile terminal comprises:

inputting, at the locking strategy setting terminal, the relevant information of the locking strategy which needs to be executed by the mobile terminal, generating an Attention (AT) command according to the relevant information of the locking strategy which needs to be executed by the mobile terminal, and transmitting the AT command to the mobile terminal, wherein the AT command comprises the relevant information of the locking strategy which needs to be executed by the mobile terminal.

In the method above, storing the relevant information of the locking strategy which needs to be executed by the mobile terminal comprises: the mobile terminal parsing the AT command to obtain the relevant information of the locking strategy of the mobile terminal, writing the relevant information in a fixed region of a FLASH of the mobile terminal and transmitting a storage result to the locking strategy setting terminal; the locking strategy setting terminal prompting whether or not the locking strategy is updated successfully according to the storage result.

The disclosure also provides a method for configuring a locking strategy of a mobile terminal, comprising:

inputting, at a mobile terminal, relevant information of a locking strategy which needs to be executed; and storing the inputted relevant information of the locking strategy which needs to be executed.

In the method above, inputting, at the mobile terminal, the relevant information the locking strategy which needs to be executed comprises: inputting, in a command receiving program installed in the mobile terminal in advance, the relevant information of the locking strategy which needs to be executed by the mobile terminal; the command receiving program generating an instruction according to the inputted relevant information of the locking strategy which needs to be executed by the mobile terminal, and transmitting the instruction to a command processing program installed in the mobile terminal in advance, wherein the instruction comprises the relevant information of the locking strategy which needs to be executed by the mobile terminal.

In the method above, storing the inputted relevant information of the locking strategy which needs to be executed comprises: the command processing program of the mobile terminal parsing the instruction that is received and writing the obtained relevant information of the locking strategy which needs to be executed by the mobile terminal in a fixed region of a FLASH of the mobile terminal; the FLASH transmitting a storage result to the command processing program of the mobile terminal; the command processing program prompting whether or not the locking strategy is updated successfully according to the storage result.

The disclosure also provides a method for applying a locking strategy of a mobile terminal, comprising:

obtaining relevant information of a locking strategy which needs to be executed by a mobile terminal, when determining that an ID of a scheme in the relevant information indicates that the locking strategy has been configured, locking the mobile terminal according to the locking strategy corresponding to the relevant information.

In the method above, the method further comprises: when determining that the ID of the scheme in the relevant information indicates that the locking strategy has not been configured, performing a normal power-on process.

In the method above, obtaining the relevant information of the locking strategy which needs to be executed by the mobile terminal comprises: during a power-on process of the mobile terminal, a power-on module of the mobile terminal reading the relevant information of the locking strategy which needs to be executed by the mobile terminal, wherein the relevant information of the locking strategy which needs to be executed by the mobile terminal is stored in a fixed region of a FLASH of the mobile terminal;

locking the mobile terminal according to the locking strategy corresponding to the relevant information comprises: the power-on module of the mobile terminal finding, in the mobile terminal, the locking strategy corresponding to the relevant information according to the relevant information that is obtained and executing the locking strategy to lock the mobile terminal.

The disclosure also provides a system for configuring a locking strategy of a mobile terminal, comprising: a locking strategy setting terminal and a terminal, wherein the locking strategy setting terminal is configured to set relevant information of a locking strategy which needs to be executed by the mobile terminal and transmit the relevant information to the mobile terminal;

the mobile terminal is configured to, when the mobile terminal determines that the mobile terminal is currently unlocked, store the relevant information of the locking strategy which needs to be executed by the mobile terminal.

In the system above, the locking strategy setting terminal is further configured to, when the mobile terminal determines that the mobile terminal is currently locked, prompt to operate over again via the locking strategy setting terminal.

The disclosure also provides a mobile terminal for implementing configuration of a locking strategy of a mobile terminal, comprising: a command receiving program module and a command processing program module, wherein the command receiving program module is configured for input of relevant information of a locking strategy which needs to be executed;

the command processing program module is configured to store, in a memory, the inputted relevant information of the locking strategy which needs to be executed.

The method, system and mobile terminal for configuring and applying a locking strategy of a mobile terminal provided by the disclosure is able to set, at a locking strategy setting terminal, relevant information of a locking strategy which needs to be executed by the mobile terminal, transmit the relevant information to the mobile terminal, and store the relevant information of the locking strategy which needs to be executed by the mobile terminal when the mobile terminal determines that the mobile terminal is currently unlocked. By doing so, the locking strategy of the mobile terminal can be configured in batches without power-on of the mobile terminal. It is safe, simple and convenient during production of the mobile terminal and the mobile terminal can be upgraded easily, thus greatly improving the production efficiency.

The disclosure can also input, at the mobile terminal, the relevant information of the locking strategy which needs to be executed and store the relevant information of the locking strategy which needs to be executed. A mobile communication operator can operate the mobile terminal directly and switch to required locking strategy at any time.

To sum up, the locking strategy of the mobile terminal can be configured flexibly so that the mobile communication operator is able to manage sales and maintenance of the mobile terminal flexibly without modifying the locking strategy by the manufacturer of the mobile terminal, thus effectively lowering research, development and maintenance costs.

DETAILED DESCRIPTION OF THE EMBODIMENTS

When a mobile communication operator needs to configure or update a locking strategy of a mobile terminal, two methods for configuring a locking strategy of a mobile terminal in accordance with embodiment of the disclosure can be adopted. The basic principle of the embodiments of the disclosure is that: relevant information of a locking strategy which needs to be executed by a mobile terminal is set at a locking strategy setting terminal and transmitted to the mobile terminal, when the mobile terminal determines that the mobile terminal is currently unlocked, the relevant information of the locking strategy which needs to be executed by the mobile terminal is stored; or, the relevant information of the locking strategy which needs to be executed is inputted at the mobile terminal, and the inputted relevant information of the locking strategy which needs to be executed is stored.

The disclosure is further described below in details according to the accompanying drawings and the embodiments.

Figure 1:
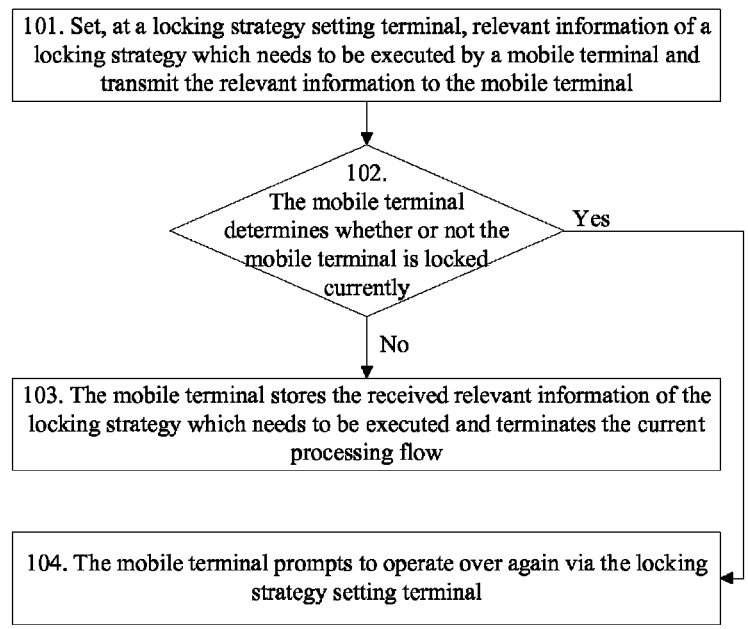
FIG. 1 is a flowchart illustrating a first method for realizing configuration of a locking strategy of a mobile terminal in accordance with an embodiment of the disclosure.

A method for configuring a locking strategy of a mobile terminal provided by an embodiment of the disclosure is as shown in FIG. 1 and comprises the following steps.

Step 101: Relevant information of a locking strategy which needs to be executed by a mobile terminal is set at a locking strategy setting terminal and transmitted to the mobile terminal.

Figure 2:
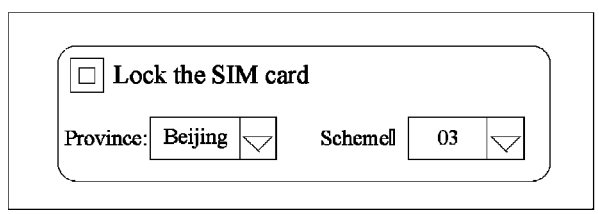
FIG. 2 is a schematic diagram illustrating a graphical user interface of a command transmission program in accordance with an embodiment of the disclosure.

More specifically, a command transmission program of the mobile terminal is installed at the locking strategy setting terminal in advance and a graphical user interface of a command transmission program is entered after the installation is completed, wherein the locking strategy setting terminal may be a computer, e.g. a Personal Computer (PC). FIG. 2 is a schematic diagram illustrating a graphical user interface of a command transmission program in accordance with the embodiment of the disclosure. As shown in FIG. 2, the relevant information, i.e. a province and a scheme of the mobile terminal, of the locking strategy which needs to be executed by the mobile terminal is inputted in the graphical user interface of the command transmission program. The province may be expressed by a 2-byte ID which corresponds to a province ID in an Integrate Circuit Card Identity (ICCID) of a SIM/USIM card of the mobile terminal. The scheme is the locking strategy which needs to be executed by the mobile terminal and expressed by a 2-byte ID. Different IDs represent different schemes, therefore the relevant information which needs to be executed by the mobile terminal is actually a 4-byte code. The command transmission program of the locking strategy setting terminal generates an AT command comprising the relevant information according to the relevant information of the locking strategy which needs to be executed by the mobile terminal and transmits the AT command to the mobile terminal via a communication link between the locking strategy setting terminal and the mobile terminal, wherein the communication link may be a physical link such as a Universal Serial Bus (USB) and a Bluetooth. If the USB is applied as the communication link, the mobile terminal does not need to be powered on when the locking strategy of the mobile terminal is configured, and the AT command can be delivered to the mobile terminal by the locking strategy setting terminal.

Step 102: The mobile terminal determines whether or not the mobile terminal is locked currently, if the mobile terminal is unlocked currently, Step 103 is executed, and if the mobile terminal is locked currently, Step 104 is executed.

More specifically, the mobile terminal is in an idle state which may be a power-off state or a state indicating that the mobile terminal is being powered on. After receiving the AT command transmitted by the locking strategy setting terminal, a command processing program of the mobile terminal reads a flag bit of a fixed region of a FLASH in the mobile terminal, determines that the mobile terminal is a mobile terminal with a card lock and a mobile terminal lock according to the flag bit and triggers a card lock and mobile terminal lock verification program of the mobile terminal. The network lock and mobile terminal lock verification program determines whether or not the fixed region of the FLASH in the mobile terminal is null, if so, it represents that the locking strategy has not been configured in the mobile terminal, i.e. the mobile terminal is not locked and Step 103 is performed; otherwise, the locking strategy has been configured in the mobile terminal, i.e. the mobile terminal has been locked, and Step 104 is performed.

Step 103: The mobile terminal stores the received relevant information of the locking strategy which needs to be executed and terminates the current processing flow.

More specifically, the command processing program installed in the mobile terminal in advance parses the AT command to obtain the relevant information of the locking strategy of the mobile terminal, writes the IDs of the province and the locking strategy which needs to be executed by the mobile terminal in the relevant information into the fixed region of the FLASH of the mobile terminal via an interface function. The mobile terminal transmits a storage result to the locking strategy setting terminal via a communication link, wherein the storage result comprises: successful storage and storage failure. The locking strategy setting terminal performs prompting via a display according to the storage result, specifically, the locking strategy setting terminal prompts that the locking strategy is updated successfully if the storage is successful, and prompts that the updating of the locking strategy fails if the storage fails.

Step 104: The mobile terminal prompts to operate over again via the locking strategy setting terminal.

More specifically, when the mobile terminal determines that the mobile terminal is locked, a result that the configuration of the locking strategy fails is transmitted to the locking strategy setting terminal via a communication link, and the locking strategy setting terminal which receives the result prompts that operations need to be performed over again, i.e. the mobile terminal needs to be unlocked first before the locking strategy is configured over again.

Figure 3:
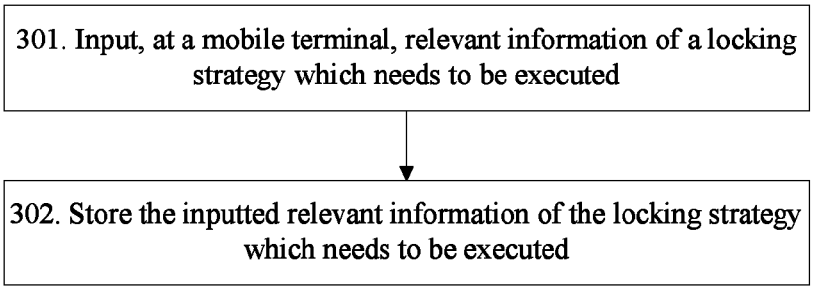
FIG. 3 is a flowchart illustrating a second method for realizing configuration of a locking strategy of a mobile terminal in accordance with an embodiment of the disclosure.

FIG. 3 is a flowchart illustrating the second method for realizing configuration of a locking strategy of a mobile terminal in accordance with an embodiment of the disclosure. As shown in FIG. 3, the method comprises the following steps.

Step 301: Relevant information of a locking strategy which needs to be executed is inputted at a mobile terminal.

More specifically, a command receiving program is installed at the mobile terminal in advance and a graphical user interface of the command receiving program is entered after the installation is completed. The relevant information of the locking strategy which needs to be executed by the mobile terminal is inputted in the graphical user interface. The relevant information comprises a province and a scheme of the mobile terminal, e.g. *983*ZZXX, wherein ZZ is an ID of the scheme which may be any combinations of numbers, e.g. 58 or 59 etc. and is configured to express different schemes; XX expresses an ID of the province and ZZ may be the same for the same province. The command receiving program of the mobile terminal generates an instruction comprising the relevant information according to the inputted relevant information of the locking strategy which needs to be executed by the mobile terminal, and transmits the instruction to a command processing program installed in the mobile terminal in advance.

Step S302: The inputted relevant information of the locking strategy which needs to be executed is stored.

More specifically, the command processing program of the mobile terminal parses the received instruction to obtain the relevant information of the locking strategy which needs to be executed by the mobile terminal, and writes the ID of the province and the locking strategy which needs to be executed by the mobile terminal in the relevant information into a fixed region of a FLASH of the mobile terminal via an interface function, for example, if the inputted relevant information of the locking strategy which needs to be executed by the mobile terminal is *983*5810, then 5810 is written in the fixed region of the FLASH of the mobile terminal. The FLASH transmits a storage result to a command processing program, wherein the storage result comprises: successful storage and storage failure. The command processing program of the mobile terminal performs prompting via a screen according to the storage result, specifically, the command processing program prompts that the locking strategy is updated successfully if the storage is successful, and prompts that the updating of the locking strategy fails if the storage fails.

Figure 4:
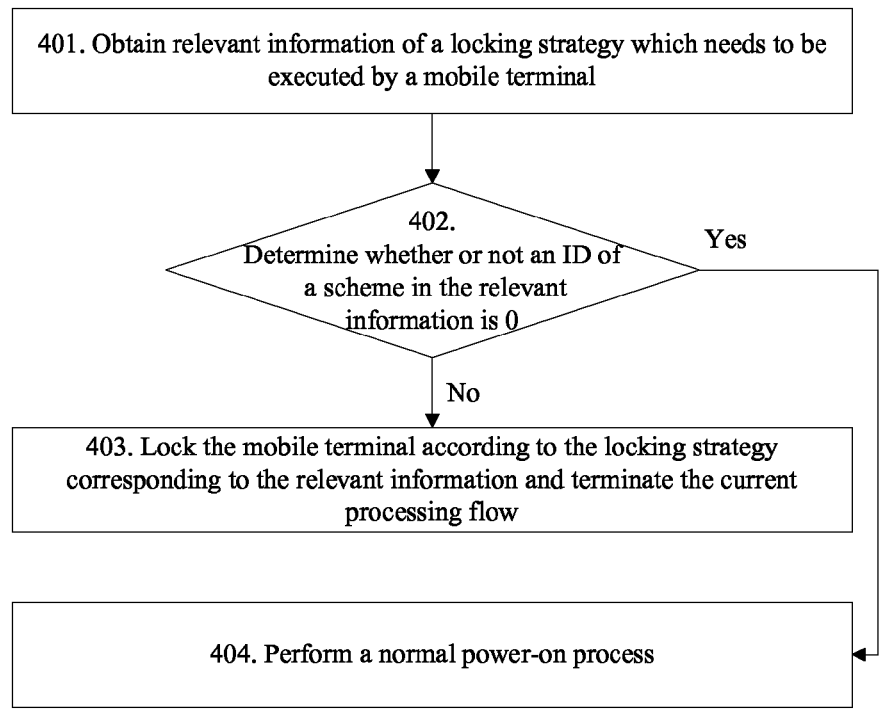
FIG. 4 is a flowchart illustrating a method for realizing application of a locking strategy of a mobile terminal in accordance with an embodiment of the disclosure.

Based on the method for configuring a locking strategy of a mobile terminal above, an embodiment of the disclosure also provides a method for applying a locking strategy of a mobile terminal. As shown in FIG. 4, the method comprises the following steps.

Step 401: Relevant information of a locking strategy which needs to be executed by a mobile terminal is obtained.

More specifically, during a power-on process of the mobile terminal, a power-on module of the mobile terminal utilizes an interface function to read the relevant information, i.e. a 4-byte code, of the locking strategy which needs to be executed, wherein the relevant information is stored in a fixed region of a FLASH of the mobile terminal.

Step 402: It is determined whether or not an ID of a scheme in the relevant information is 0, if it is not 0, Step 403 is performed, and if it is 0, Step 404 is performed.

More specifically, according to the read relevant information, the power-on module of the mobile terminal determines whether the last two bytes in the relevant information, i.e. the ID of the scheme, is 0, if it is not 0, it represents that the locking strategy of the mobile terminal has been configured and Step 403 is performed; and if it is 0, the locking strategy of the mobile terminal has not been configured and Step 404 is performed.

Step 403: The mobile terminal is locked according to the locking strategy corresponding to the relevant information, and the current processing flow is ended.

More specifically, since the locking strategy of the mobile terminal has been configured, the power-on module of the mobile terminal finds, in the mobile terminal, the locking strategy corresponding to the relevant information according to the obtained relevant information and executes the locking strategy to lock the mobile terminal. Executing the locking strategy to lock the mobile terminal belongs to an existing technology, which will not be repeated here. The locking strategy in the mobile terminal is pre-stored, in a form of a code, in a program of the mobile terminal. There may be one or more locking strategies in the embodiment of the disclosure and switching among different locking strategies of the mobile terminal can be realized using the two methods above.

Step 404: A normal power-on process is performed.

More specifically, since the locking strategy of the mobile terminal is not configured in the mobile terminal, the mobile terminal can be powered on normally. The normal power-on process of the mobile terminal is performed, which belongs to an existing technology and will not be repeated here.

Figure 5:
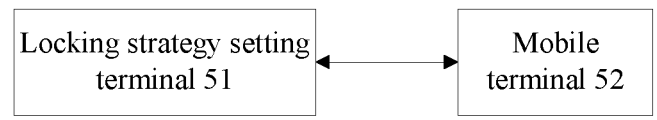
FIG. 5 is a structural diagram illustrating a system for realizing configuration of a locking strategy of a mobile terminal in accordance with an embodiment of the disclosure.

To realize the methods above, an embodiment of the disclosure also provides a system for configuring a locking strategy of a mobile terminal. As shown in FIG. 5, the system comprises: a locking strategy setting terminal 51 and a terminal 52, wherein the locking strategy setting terminal 51 is configured to set relevant information of a locking strategy which needs to be executed by a mobile terminal and transmit the relevant information to the mobile terminal 52; and the mobile terminal 52 is configured to, when the mobile terminal determines that the mobile terminal is currently unlocked, store the relevant information of the locking strategy which needs to be executed by the mobile terminal.

The locking strategy setting terminal 51 is further configured to, when the mobile terminal 52 determines that the mobile terminal 52 is currently locked, prompt to operate over again.

Setting, at the locking strategy setting terminal 51, the relevant information of the locking strategy which needs to be executed by the mobile terminal and transmitting the relevant information to the mobile terminal 52 comprises: the relevant information of the locking strategy which needs to be executed by the mobile terminal is inputted at the locking strategy setting terminal 51, and according to the relevant information of the locking strategy which needs to be executed by the mobile terminal, an AT command comprising the relevant information is generated and transmitted to the mobile terminal 52.

Storing the relevant information of the locking strategy which needs to be executed by the mobile terminal comprises: the mobile terminal 52 parses the AT command to obtain the relevant information of the locking strategy of the mobile terminal, writes the relevant information in a fixed region of a FLASH of the mobile terminal 52 and transmits a storage result to the locking strategy setting terminal 51; the locking strategy setting terminal 51 prompts whether or not the locking strategy is updated successfully according to the storage result.

Figure 6:
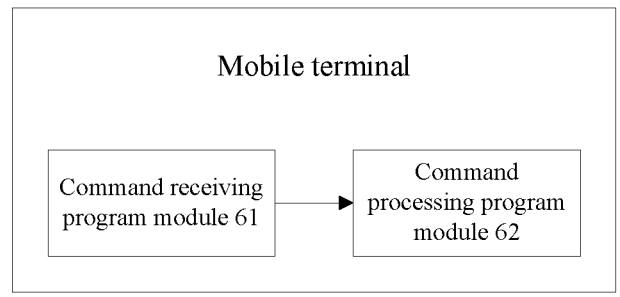
FIG. 6 is a structural diagram illustrating a mobile terminal for realizing configuration of a locking strategy of a mobile terminal in accordance with an embodiment of the disclosure.

An embodiment of the disclosure also provides a mobile terminal for implementing configuration of a locking strategy of a mobile terminal. As shown in FIG. 6, the mobile terminal comprises: a command receiving program module 61 and a command processing program module 62, wherein the command receiving program module 61 is configured for input of relevant information of a locking strategy which needs to be executed;

the command processing program module 62 is configured to store, in a memory, the relevant information of the locking strategy which needs to be executed.

Inputting the relevant information of the locking strategy which needs to be executed comprises: the relevant information of the locking strategy which needs to be executed by the mobile terminal is inputted in the command receiving program module 61 in the mobile terminal; the command receiving program module 61 generates an instruction comprising the relevant information according to the inputted relevant information of the locking strategy which needs to be executed by the mobile terminal and transmits the instruction to the command processing program module 62 installed in the mobile terminal in advance.

Storing the inputted relevant information of the locking strategy which needs to be executed comprises: the command processing program module 62 of the mobile terminal parses the received instruction and writes the obtained relevant information of the locking strategy which needs to be executed by the mobile terminal in a fixed region of a FLASH of the mobile terminal; the FLASH transmits a storage result to the command processing program module 61 of the mobile terminal; the command processing program module 62 prompts whether or not the locking strategy is updated successfully according to the storage result.

The above are only preferred embodiments of the disclosure and should not be used for limiting the scope of protection of the disclosure. Any modifications, equivalent replacements, improvements and the like within the principle of the disclosure shall fall within the scope of protection of the disclosure.

What is claimed is:

1. A method for configuring a locking strategy of a mobile terminal, comprising:
   setting, at a locking strategy setting terminal, relevant information of a locking strategy which needs to be executed by a mobile terminal;
   generating an Attention (AT) command according to the relevant information of the locking strategy which needs to be executed by the mobile terminal;
   transmitting the AT command to the mobile terminal, wherein the AT command comprises the relevant information of the locking strategy which needs to be executed by the mobile terminal; and
   when the mobile terminal determines that the mobile terminal is currently unlocked, storing the relevant information of the locking strategy which needs to be executed by the mobile terminal.

2. The method according to claim 1, further comprising: when the mobile terminal determines that the mobile terminal is currently locked, prompting to reconfigure a locking strategy via the locking strategy setting terminal.

3. The method according to claim 1, wherein storing the relevant information of the locking strategy which needs to be executed by the mobile terminal comprises: the mobile terminal parsing the AT command to obtain the relevant information of the locking strategy of the mobile terminal, writing the relevant information in a fixed region of a FLASH of the mobile terminal and transmitting a storage result to the locking strategy setting terminal; the locking strategy setting terminal prompting whether or not the locking strategy is updated successfully according to the storage result.

4. A method for configuring a locking strategy of a mobile terminal, comprising:
inputting, at a mobile terminal, relevant information of a locking strategy which needs to be executed; and
a command processing program installed in the mobile terminal in advance parsing the instruction that is received and writing the obtained relevant information of the locking strategy which needs to be executed by the mobile terminal in a fixed region of a FLASH of the mobile terminal;
the FLASH transmitting a storage result to the command processing program of the mobile terminal;
the command processing program prompting whether or not the locking strategy is updated successfully according to the storage result.

5. The method according to claim 4, wherein inputting, at the mobile terminal, the relevant information the locking strategy which needs to be executed comprises:
inputting, in a command receiving program installed in the mobile terminal in advance, the relevant information of the locking strategy which needs to be executed by the mobile terminal;
the command receiving program generating an instruction according to the inputted relevant information of the locking strategy which needs to be executed by the mobile terminal, and transmitting the instruction to the command processing program installed in the mobile terminal in advance, wherein the instruction comprises the relevant information of the locking strategy which needs to be executed by the mobile terminal.

6. A method for applying a locking strategy of a mobile terminal, comprising:
obtaining relevant information of a locking strategy which needs to be executed by a mobile terminal, when determining that an ID of a scheme in the relevant information indicates that the locking strategy has been configured, locking the mobile terminal according to the locking strategy corresponding to the relevant information;
wherein obtaining the relevant information of the locking strategy which needs to be executed by the mobile terminal comprises: during a power-on process of the mobile terminal, a power-on module of the mobile terminal reading the relevant information of the locking strategy which needs to be executed by the mobile terminal, wherein the relevant information of the locking strategy which needs to be executed by the mobile terminal is stored in a fixed region of a FLASH of the mobile terminal;
locking the mobile terminal according to the locking strategy corresponding to the relevant information comprises: the power-on module of the mobile terminal finding, in the mobile terminal, the locking strategy corresponding to the relevant information according to the relevant information that is obtained and executing the locking strategy to lock the mobile terminal.

7. The method according to claim 6, further comprising:
when determining that the ID of the scheme in the relevant information indicates that the locking strategy has not been configured, performing a normal power-on process.

8. A system for configuring a locking strategy of a mobile terminal, wherein the system comprises: a locking strategy setting terminal and a mobile terminal, wherein
the locking strategy setting terminal is configured to set relevant information of a locking strategy which needs to be executed by the mobile terminal, generate an Attention (AT) command according to the relevant information of the locking strategy which needs to be executed by the mobile terminal, and transmit the AT command to the mobile terminal, wherein the AT command comprises the relevant information of the locking strategy which needs to be executed by the mobile terminal;
the mobile terminal is configured to, when the mobile terminal determines that the mobile terminal is currently unlocked, store the relevant information of the locking strategy which needs to be executed by the mobile terminal.

9. The system according to claim 8, wherein
the locking strategy setting terminal is further configured to, when the mobile terminal determines that the mobile terminal is currently locked, prompt to reconfigure a locking strategy via the locking strategy setting terminal.

10. A mobile terminal for implementing configuration of a locking strategy of a mobile terminal, wherein the mobile terminal comprises: a command receiving program module and a command processing program module, wherein
the command receiving program module is configured for input of relevant information of a locking strategy which needs to be executed;
the command processing program module is configured to parse the instruction that is received and writing the obtained relevant information of the locking strategy which needs to be executed by the mobile terminal in a fixed region of a FLASH of the mobile terminal, receive a storage result from the FLASH, and prompt whether or not the locking strategy is updated successfully according to the storage result.

11. The method according to claim 2, wherein storing the relevant information of the locking strategy which needs to be executed by the mobile terminal comprises: the mobile terminal parsing the AT command to obtain the relevant information of the locking strategy of the mobile terminal, writing the relevant information in a fixed region of a FLASH of the mobile terminal and transmitting a storage result to the locking strategy setting terminal; the locking strategy setting terminal prompting whether or not the locking strategy is updated successfully according to the storage result.

* * * * *